United States Patent
Stojanovski et al.

(10) Patent No.: US 9,906,947 B2
(45) Date of Patent: Feb. 27, 2018

(54) MOBILE TERMINATED COMMUNICATION METHOD AND RELATED DEVICES

(75) Inventors: Saso Stojanovski, Paris (FR); Arnaud Vedrine, Paris (FR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 13/393,947

(22) PCT Filed: Oct. 12, 2010

(86) PCT No.: PCT/KR2010/006972
§ 371 (c)(1),
(2), (4) Date: May 9, 2012

(87) PCT Pub. No.: WO2011/046348
PCT Pub. Date: Apr. 21, 2011

(65) Prior Publication Data
US 2012/0224516 A1    Sep. 6, 2012

Related U.S. Application Data

(60) Provisional application No. 61/250,840, filed on Oct. 12, 2009, provisional application No. 61/303,262, (Continued)

(51) Int. Cl.
*H04W 8/26* (2009.01)
*H04L 29/12* (2006.01)
*H04W 76/02* (2009.01)

(52) U.S. Cl.
CPC .......... *H04W 8/26* (2013.01); *H04L 29/1249* (2013.01); *H04L 29/12066* (2013.01);
(Continued)

(58) Field of Classification Search
None
See application file for complete search history.

(56) References Cited

U.S. PATENT DOCUMENTS 6,614,774 B1 * 9/2003 Wang ............................ 370/338
6,944,167 B1 * 9/2005 McPherson .................. 370/401
(Continued)

FOREIGN PATENT DOCUMENTS

CN        101019402 A      8/2007
EP        1 263 171        12/2002
(Continued)

OTHER PUBLICATIONS

3GPP TS 23.401 (V9.2.0)—"LTE; General Packet Radio Service (GPRS) enhancements for Evolved Universal Terrestrial Radio Access Network (E-UTRAN) access"; ETSI 3GPP; Oct. 2009; entire document.*
(Continued)

*Primary Examiner* — Chirag Shah
*Assistant Examiner* — Suk Jin Kang
(74) *Attorney, Agent, or Firm* — Morgan, Lewis & Bockius LLP

(57) ABSTRACT

Method for allowing a mobile terminated communication to a destination device (2) through at least one mobile communication network (10) from a source entity (1) located in a public IP address network (9). The method comprises: a subscriber server (3) of the mobile communication network receiving an IP address ("D") of the destination device from a node (4) of the mobile communication network, and the subscriber server updating a DNS record containing a static unique identifier of the destination device stored in an authoritative DNS server (5) reachable via the public IP address network, with said destination device IP address.

16 Claims, 7 Drawing Sheets

Related U.S. Application Data filed on Feb. 10, 2010, provisional application No. 61/303,614, filed on Feb. 11, 2010.

(52) U.S. Cl.
CPC .. *H04L 29/12575* (2013.01); *H04L 29/12669* (2013.01); *H04L 29/12905* (2013.01); *H04L 61/1511* (2013.01); *H04L 61/256* (2013.01); *H04L 61/2592* (2013.01); *H04L 61/304* (2013.01); *H04L 61/6054* (2013.01); *H04L 29/12188* (2013.01); *H04L 61/1588* (2013.01); *H04W 76/021* (2013.01)

(56) References Cited

U.S. PATENT DOCUMENTS

| | | | |
|---|---|---|---|
| 7,143,187 B1* | 11/2006 | Takeda et al. | 709/245 |
| 7,313,631 B1* | 12/2007 | Sesmun et al. | 709/245 |
| 8,442,526 B1* | 5/2013 | Bertz et al. | 455/435.1 |
| 2004/0013116 A1* | 1/2004 | Greis et al. | 370/392 |
| 2005/0086373 A1* | 4/2005 | Banerjee et al. | 709/245 |
| 2005/0111399 A1* | 5/2005 | Sapienza et al. | 370/328 |
| 2005/0226180 A1* | 10/2005 | Devarapalli et al. | 370/328 |
| 2007/0186000 A1* | 8/2007 | Nikander et al. | 709/228 |
| 2008/0076393 A1* | 3/2008 | Khetawat et al. | 455/411 |
| 2008/0076412 A1* | 3/2008 | Khetawat et al. | 455/432.1 |
| 2008/0076420 A1* | 3/2008 | Khetawat et al. | 455/435.1 |
| 2008/0114898 A1* | 5/2008 | Takeda et al. | 709/245 |
| 2008/0147885 A1* | 6/2008 | Bessis | 709/250 |
| 2009/0016369 A1* | 1/2009 | Banerjee et al. | 370/408 |
| 2009/0043902 A1* | 2/2009 | Faccin | 709/229 |
| 2009/0047947 A1* | 2/2009 | Giaretta et al. | 455/432.1 |
| 2009/0080387 A1 | 3/2009 | Dell'Uomo et al. | |
| 2009/0156253 A1* | 6/2009 | Shi et al. | 455/558 |
| 2009/0161666 A1* | 6/2009 | Ku | 370/356 |
| 2009/0196265 A1* | 8/2009 | Mariblanca Nieves et al. | 370/338 |
| 2009/0268722 A1* | 10/2009 | Gallagher et al. | 370/352 |
| 2009/0270097 A1* | 10/2009 | Gallagher et al. | 455/435.1 |
| 2009/0270098 A1* | 10/2009 | Gallagher et al. | 455/435.1 |
| 2009/0270099 A1* | 10/2009 | Gallagher et al. | 455/435.1 |
| 2010/0054222 A1* | 3/2010 | Rune | H04L 29/12066 370/338 |
| 2010/0223222 A1* | 9/2010 | Zhou | H04L 12/14 706/47 |
| 2011/0047256 A1* | 2/2011 | Babu | H04L 29/12367 709/223 |
| 2012/0008567 A1* | 1/2012 | Eisl et al. | 370/329 |
| 2012/0164979 A1* | 6/2012 | Bachmann et al. | 455/411 |
| 2012/0236846 A1* | 9/2012 | Ku | 370/352 |

FOREIGN PATENT DOCUMENTS

| | | |
|---|---|---|
| KR | 10-2001-0028888 A | 4/2001 |
| KR | 10-2007-0061744 | 6/2007 |
| KR | 10-2007-0122015 A | 12/2007 |
| KR | 10-2008-0039618 | 5/2008 |
| KR | 10-2008-0093731 A | 10/2008 |
| KR | 10-2009-0015239 | 2/2009 |
| WO | 02/35801 A2 | 5/2002 |
| WO | 2006010382 A1 | 2/2006 |
| WO | 2008/107157 A2 | 9/2008 |

OTHER PUBLICATIONS

Le, A Review of Mobility Support Paradigms for the Internet, IEEE Communications Surveys & Tutorials, 1st Quarter, vol. 8, pp. 38-51, 2006.

Faltstrom, The E.164 to Uniform Resource Identifiers (URI) Dynamic Delegation Discovery System (DDDS) Application (ENUM), Memo, The Internet Society, 2004.

Notice of Allowance issued in counterpart Australian Patent Application No. 2010307519 dated Nov. 28, 2013.

Office Action issued in corresponding Korean Patent Application No. 10-2012-7009059 dated Jul. 19, 2013.

Perkins, C., "IP Mobility Support for IPv4", Network Working Group, RFC 3344, Aug. 2002.

Notice of Allowance issued in corresponding Korean Patent Application No. 10-2012-7009059 dated Jan. 15, 2014.

Office Action dated Apr. 28, 2014, issued by the State Intellectual Property Office of China in Chinese Patent Application No. 201080045723.3.

* cited by examiner

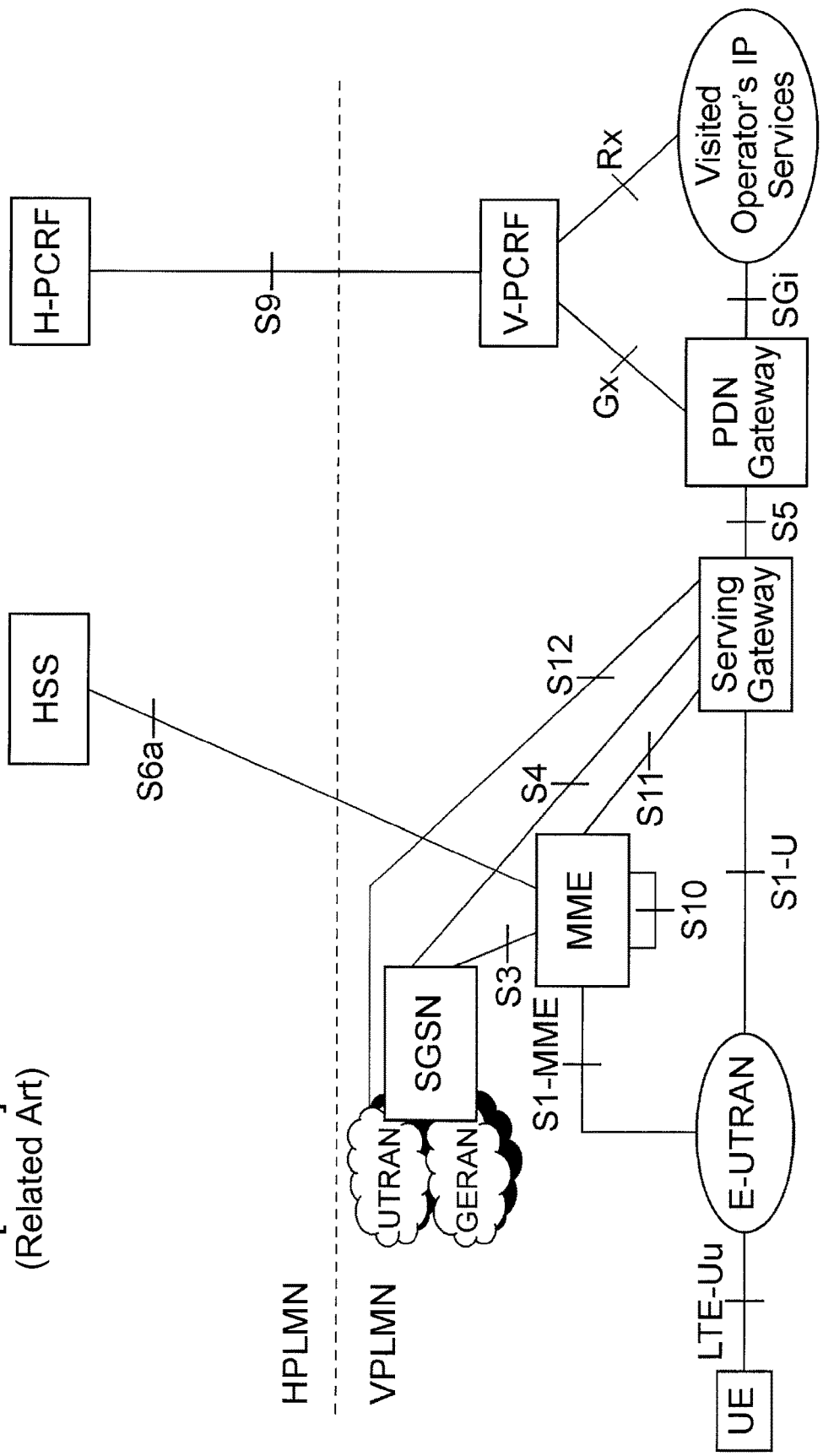

[Fig. 2]
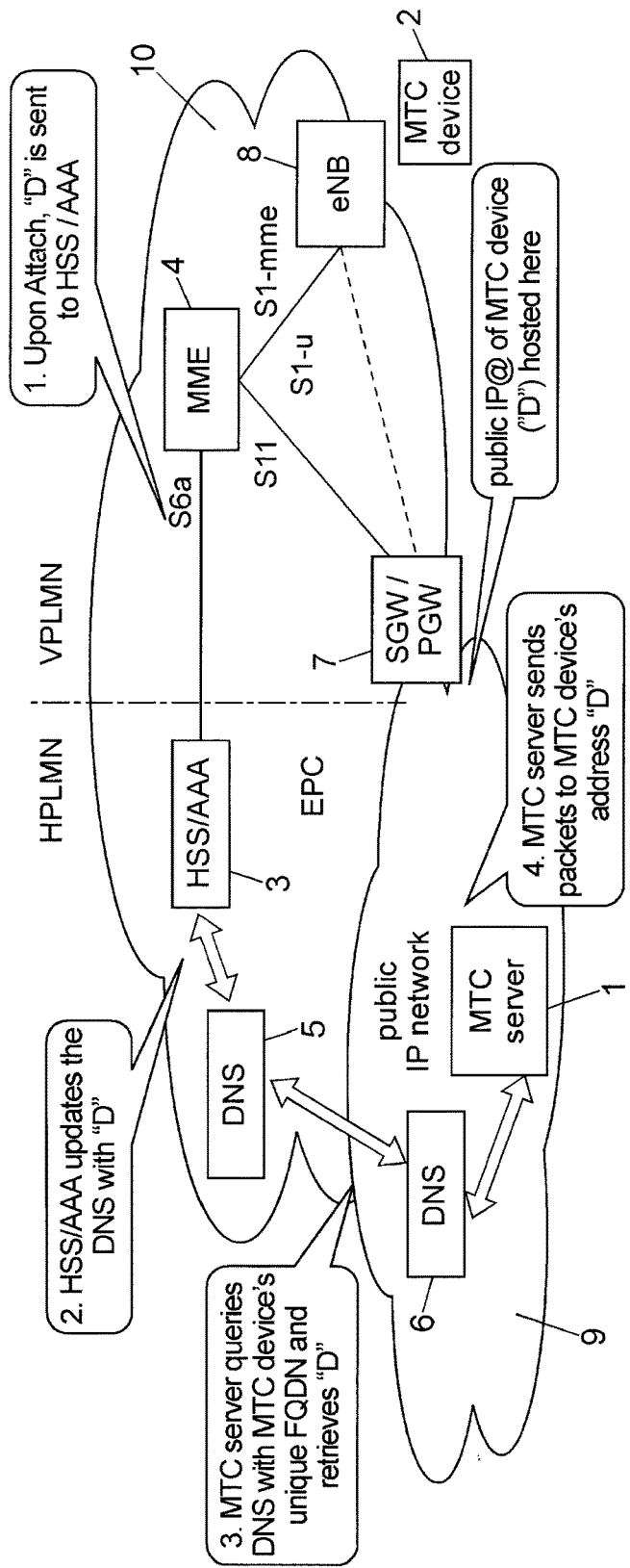

[Fig. 3]
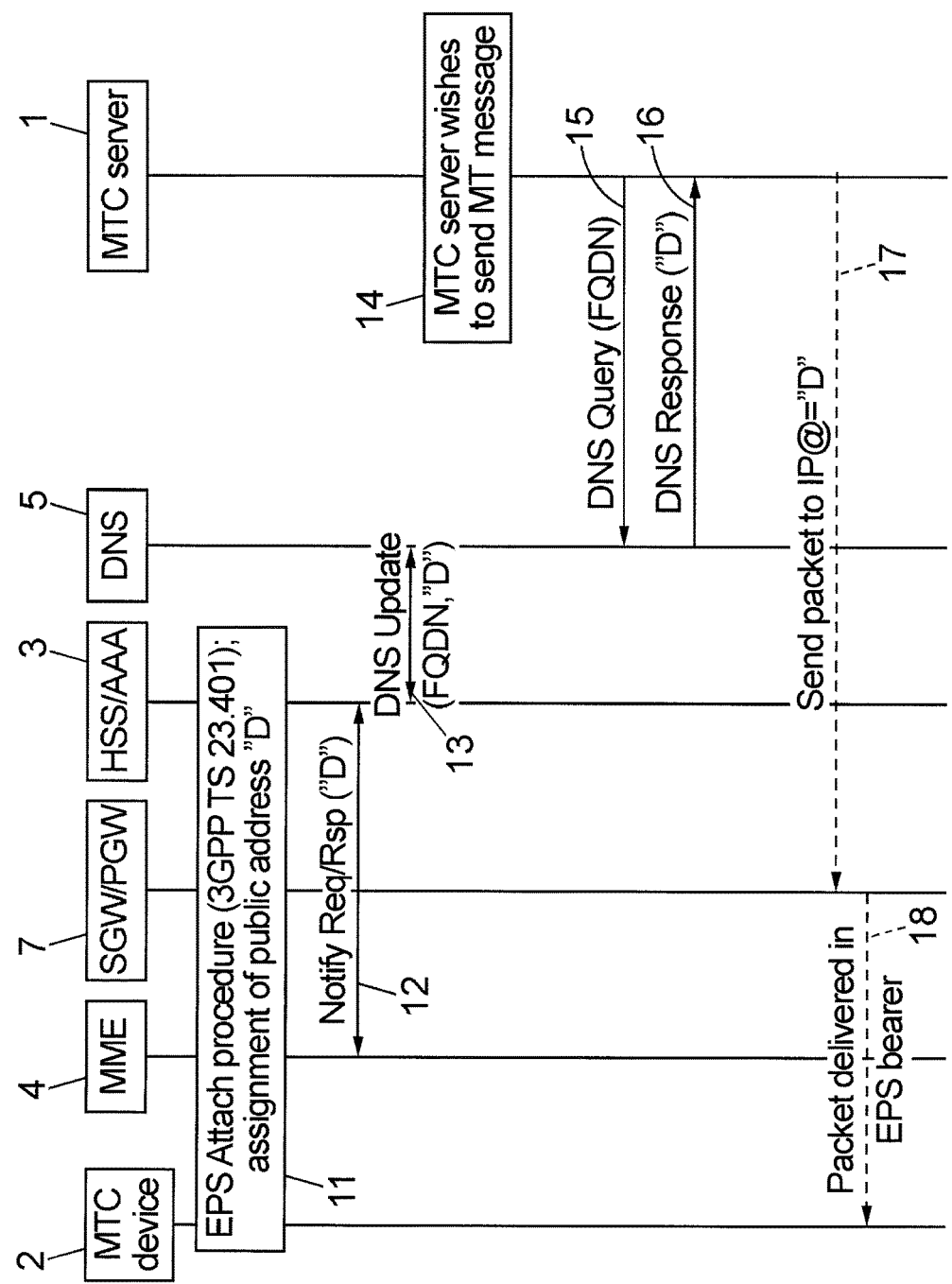

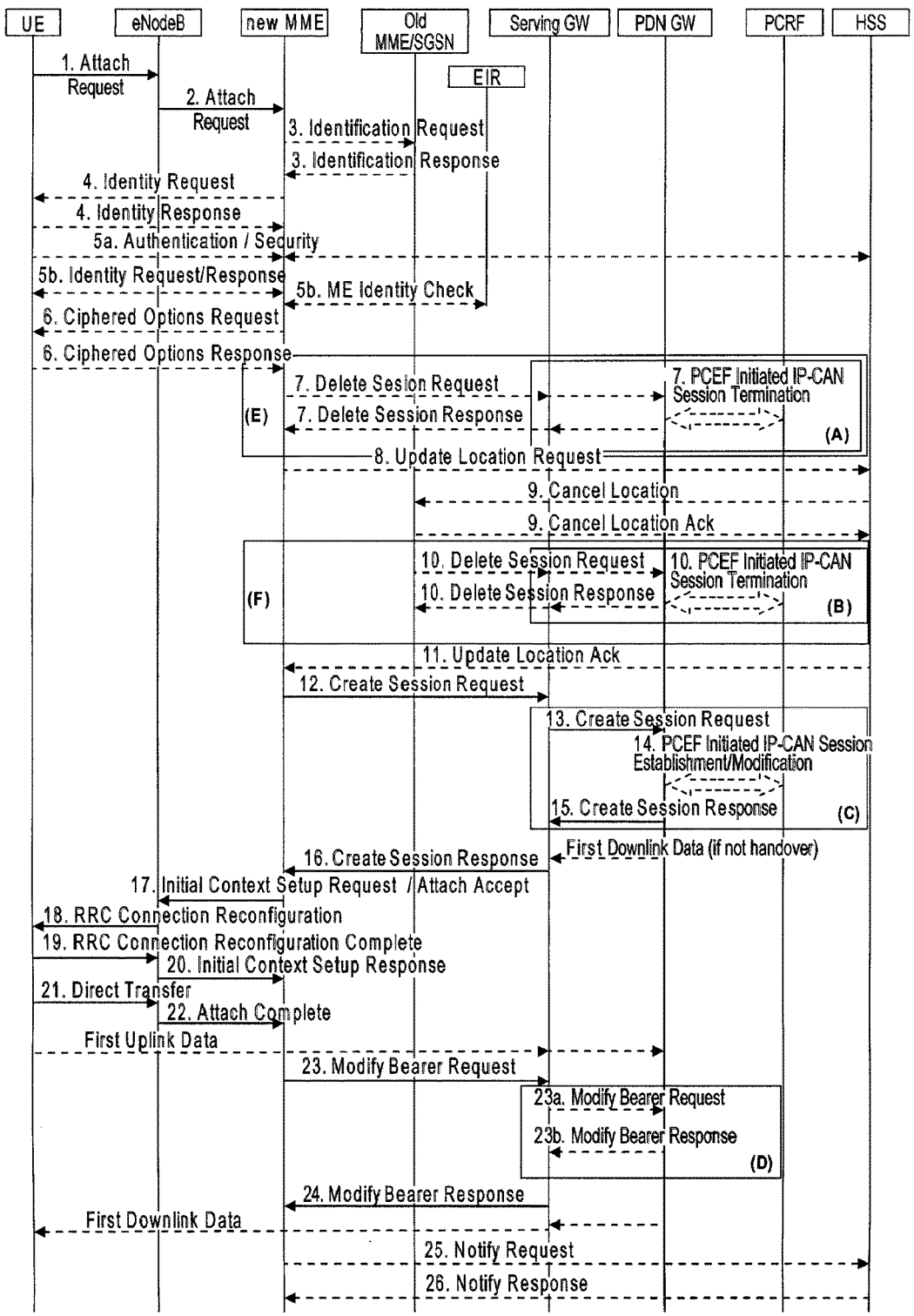
[Fig. 4]

[Fig. 5]
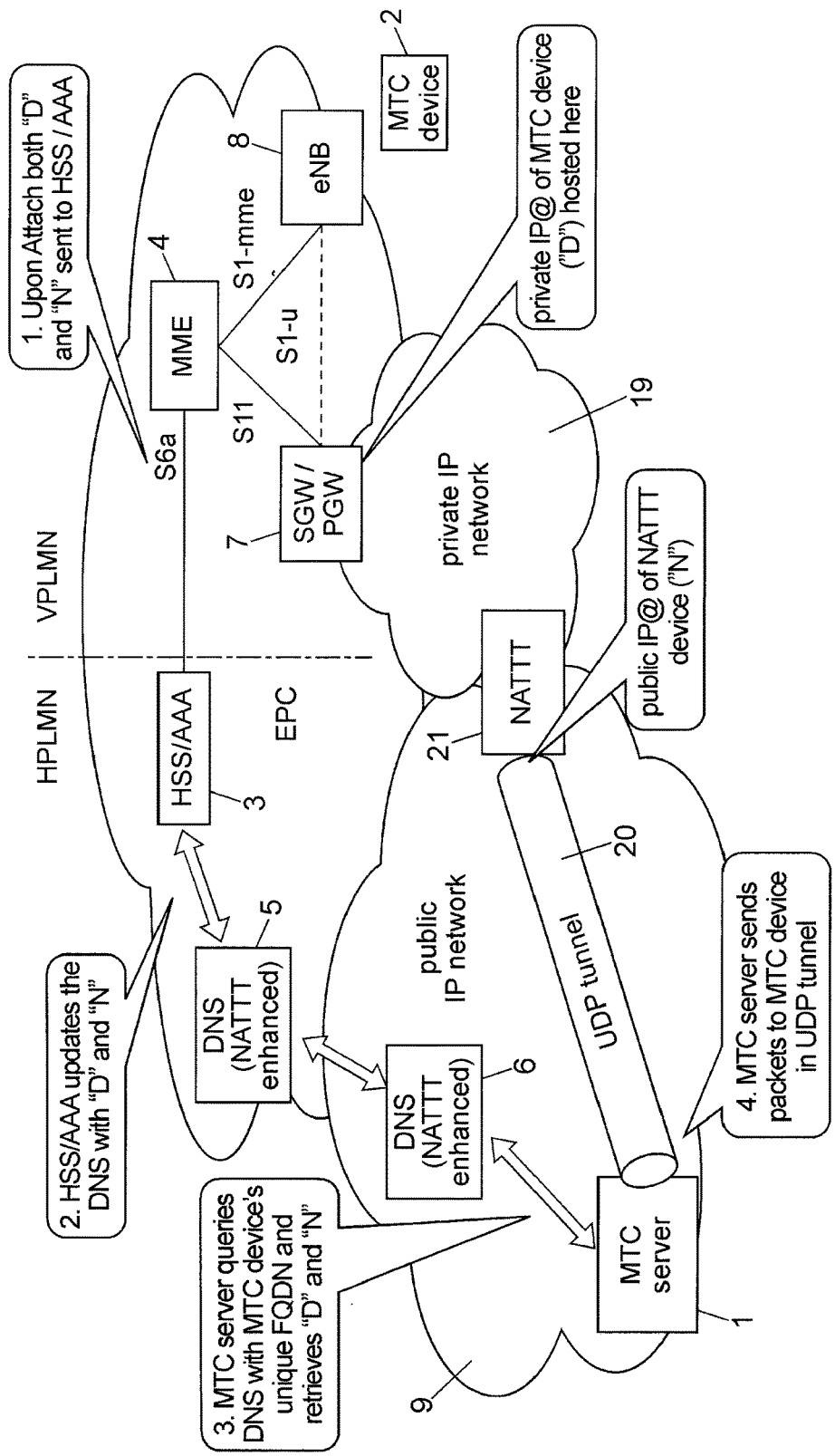

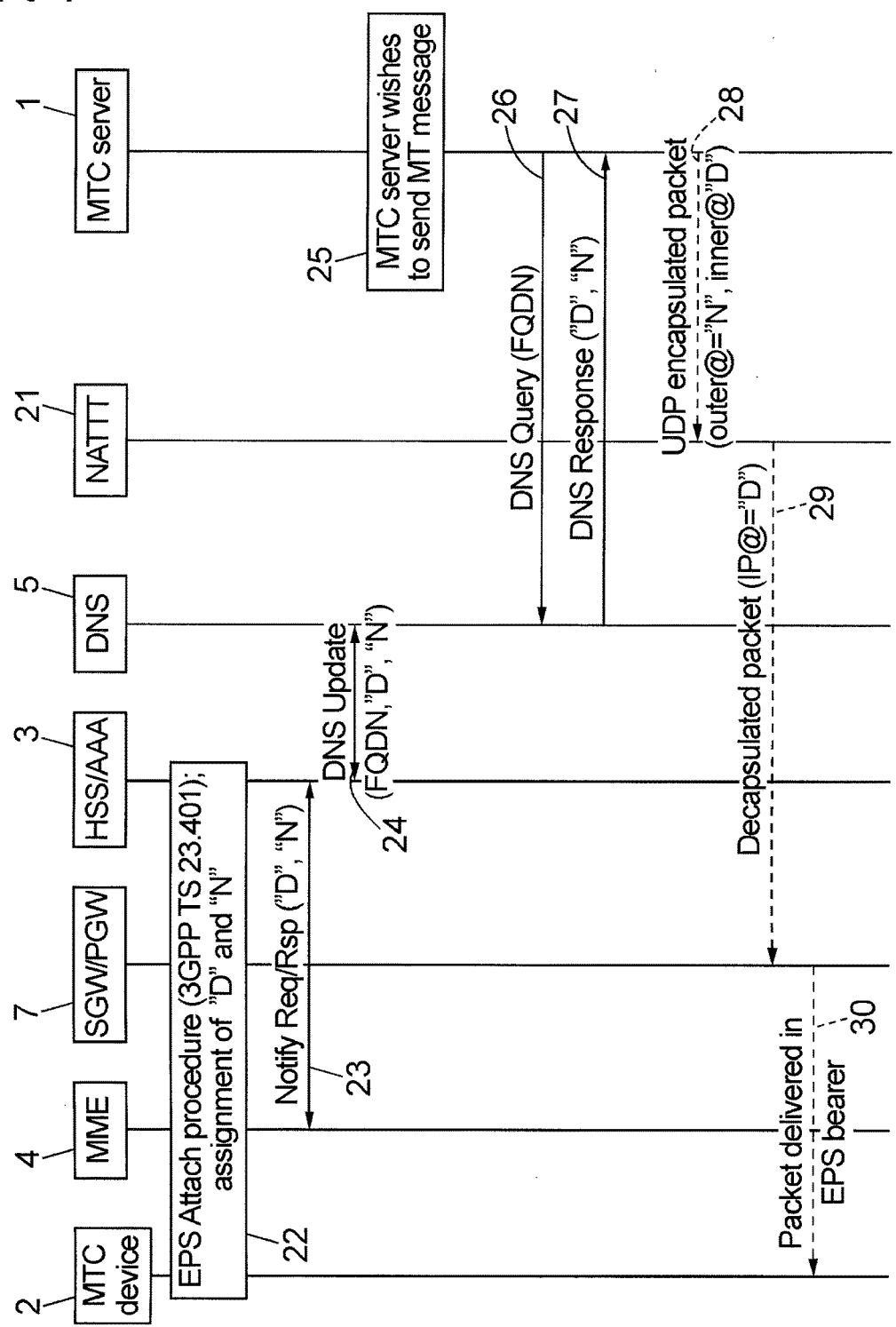
[Fig. 6]

[Fig. 7]
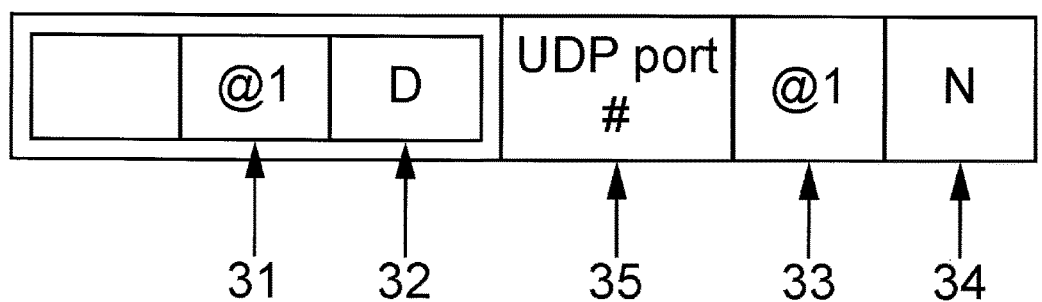

MOBILE TERMINATED COMMUNICATION METHOD AND RELATED DEVICES

The present application is a national stage of PCT International Application No. PCT/KR2010/006972, filed Oct. 12, 2010, and claims the benefit of US Provisional Application Nos. 61/250,840, filed Oct. 12, 2009, 61/303,262, filed Feb. 10, 2010, and 61/303,614, filed Feb. 11, 2010.

TECHNICAL FIELD

The present invention relates to mobile terminated communication.

BACKGROUND ART

Mobile terminated communication from a source entity (calling party) to a destination device (called party) in a mobile communication system can be performed easily when the source entity knows an identifier of the destination device with which the destination device can be reached, such as a phone number.

There are situations however where the identifier with which the destination device can be reached is not known by the source entity.

Let us take the non-limiting example of the Evolved Packet System (EPS) architecture as defined in 3GPP TR 23.401 (GPRS enhancements for E-UTRAN access). In the EPS architecture, the Evolved Packet Core (EPC) network exists in several flavours. Depicted in FIG. 1 is the roaming EPC architecture with Local Breakout, which basically means that the IP address and the services in this configuration are provided by the Visited network. The IP address being hosted on a Packet Data Network Gateway (PDN GW or PGW), the latter also resides in the Visited network.

Another major EPC flavour (not shown here) is the "home routed" EPC architecture, which is used when the IP address and the services are hosted in the Home network.

EPC is a Packet Switched (PS) domain only architecture. All communications to and from a terminal are based on IP packet communication. The IP address assigned to the terminal can belong to the public or private address space. In the latter case, a Network Address Translation (NAT) device residing on or beyond the SGi reference point may be used for IP address translation.

When the terminal is assigned an IP address (public or private), the latter can be used immediately for client-server communications i.e. for communications that are always initiated by a client application running on the terminal.

However, barring some special cases of limited interest (e.g. statically assigned public IP addresses), this is not sufficient for enabling mobile terminated communications, such as "push" type communications (i.e. communications initiated by a server in the network towards the mobile device) or peer-to-peer communications (e.g. communications between two mobile devices).

If the IP address of the mobile device were known in advance by the server, then the latter could initiate Mobile Terminated (MT) communications with no problem. However, most of the time a new IP address is dynamically assigned to the mobile device every time it attaches to the network, the main reason being that it may be assigned by a different administration than the one owning the mobile user's subscription. For instance, in reference to the Local Breakout architecture in FIG. 1, the IP address is assigned by the Visited network (VPLMN), so it cannot be known in advance by the Home network (HPLMN).

Traditionally, the problem with MT communications has been approached in one of the following ways:
- By using a separate channel (e.g. SMS) for delivery of a "push" stimulus to the terminal, triggering the latter to contact the server via client-server IP communication;
- By overlaying a subsystem for peer-to-peer communications on top of EPS (e.g. the 3GPP's IP Multimedia Subsystem—IMS).

While both approaches are used today in 3GPP standards, they may not be suitable in certain cases because they put additional complexity on the device in the form of additional communication channel (e.g. SMS) or additional client software (e.g. IMS). Moreover, both these approaches incur additional delay, which makes them less suitable for time critical delivery of mobile terminated messages.

DISCLOSURE OF INVENTION

Technical Problem

An object of the present invention is to improve this situation.

Solution to Problem

The invention proposes a method for allowing a mobile terminated communication to a destination device through at least one mobile communication network from a source entity located in a public IP address network, said method comprising: a subscriber server of the mobile communication network receiving an IP address of the destination device from a node of the mobile communication network, and the subscriber server updating a DNS record containing a static unique identifier of the destination device stored in an authoritative DNS server reachable via the public IP address network, with said destination device IP address.

With the above mentioned features, the invention thus proposes a simple solution to the problem of sending messages to destination devices inside public or private IP address space. The solution avoids terminal complexity that was required in prior art (e.g. separate communication channel via SMS or IMS client), which makes it particularly suited e.g. to MTC devices (noting that it could also apply to non-MTC devices, like UEs or others).

According to advantageous embodiments that may be combined in any possible manner, the invention may also include at least some of the following features:
- the static unique identifier is defined in addition to and in relation with an identity of the destination device within the mobile communication network; and/or
- the destination device IP address is assigned during an attach procedure of the destination device with the mobile communication network; and/or
- said destination device is an MTC device and said source entity is an MTC server or an MTC device; and/or
- the destination device is assigned a private IP address within a private IP address network, the method further comprising: said subscriber server further receiving from said node of the mobile communication network a public IP address of a tunneling border device located on the border of the private IP address network, through which said destination device private IP address is reachable and which terminates a tunnel for IP packets sent from the source entity to the destination device; and the subscriber server further updating said DNS record containing the static unique identifier of the destination device stored in the authoritative DNS server, with said tunneling border device public IP address; and/or the method further comprises, when a mobile terminated communication to the destination device is to be initiated through the mobile communication network by the source entity: sending a DNS query to the DNS server by the source entity, the DNS query including the static unique identifier of the destination device; receiving a DNS response from the DNS server at the source entity, the DNS response including said destination device IP address, and sending at least one IP packet intended to the destination device by the source entity, by using said destination device IP address as a destination IP address; and/or the DNS response further includes said tunneling border device public IP address and said at least one IP packet is sent to the tunneling border device in an encapsulated manner so as to have a destination IP address in an outer IP header set to said tunneling border device public IP address and a destination IP address in an inner IP header set to said destination device private IP address; and/or said at least one IP packet includes an indication for the tunneling border device to decapsulate and forward it, such as a UDP header including a UDP port set to a predetermined value; and/or said at least one IP packet also has a source IP address set to the public IP address of the source entity in both the inner and outer IP headers; and/or the method further comprises: the tunneling border device decapsulating said at least one IP packet by stripping off the outer IP header, and forwarding the resulting at least one inner IP packet to the mobile communication network, and a node of the mobile communication network hosting the private IP address of the destination device receiving the forwarded at least one inner IP packet and delivering it to the destination device via a mobile communication network bearer.

According to another aspect, the invention also proposes a subscriber server arranged for being used in at least one mobile communication network through which a mobile terminated communication to a destination device may take place from a source entity located in a public IP address network, the subscriber server comprising a reception unit for receiving an IP address of the destination device and an updating unit for updating a DNS record containing a static unique identifier of the destination device stored in an authoritative DNS server reachable via the public IP address network, with said destination device IP address.

According to another aspect, the invention also proposes an entity arranged for initiating a mobile terminated communication to a destination device through at least one mobile communication network when located in a public IP address network, the entity comprising: a first sending unit for sending a DNS query to a DNS server, the DNS query including the static unique identifier of the destination device; a receiving unit for receiving a DNS response from the DNS server, the DNS response including an IP address of the destination device, and a second sending unit for sending at least one IP packet intended to the destination device, by using the destination device IP address as a destination IP address.

When the destination device is assigned a private IP address within a private IP address network and when the DNS response further includes a public IP address of a tunneling border device located on the border of the private IP address network, through which said destination device private IP address is reachable and which terminates a tunnel for IP packets sent from the entity to the destination device, the second sending unit may further be arranged for sending the at least one IP packet to the tunneling border device in an encapsulated manner so as to have a destination IP address in an outer IP header set to said tunneling border device public IP address and a destination IP address in an inner IP header set to said destination device private IP address.

BRIEF DESCRIPTION OF DRAWINGS

The preferred features of the above aspects which are indicated by the dependent claims may be combined as appropriate, and may be combined with any of the above aspects of the invention, as would be apparent to a person skilled in the art.

FIG. 1, already discussed, shows a conventional roaming EPC architecture with Local Breakout;

FIG. 2 is a schematic view of an exemplary system architecture in which the present invention may take place according to a first embodiment;

FIG. 3 is a flowchart showing exemplary messages exchanged in the system of FIG. 2 within the framework of a first embodiment of the invention;

FIG. 4 is a flowchart showing messages exchanged within the framework of a conventional EPS Attach procedure;

FIG. 5 is a schematic view of a system architecture in which the present invention may take place according to a second embodiment;

FIG. 6 is a flowchart showing exemplary messages exchanged in the system of FIG. 5 within the framework of a second embodiment of the invention;

FIG. 7 is a schematic view of an encapsulated IP packet that may be used within the framework of the second embodiment of the invention.

MODE FOR THE INVENTION

The invention is illustrated here in its application to mobile terminated communication to an MTC device from an MTC server.

It is reminded that MTC refers to Machine-Type Communication, which is a form of data communication which involves one or more entities that do not need human interaction. MTC is a Release-10 work item in 3GPP and the related service requirements are being specified in 3GPP TS 22.368 (Service requirements for Machine Type Communications; Stage 1), whereas the study on the MTC architecture is carried out in 3GPP TR 23.888 (System improvements for Machine Type Communications). Two predicted aspects of MTC are: a potentially very large number of communicating terminals, and to a large extent, little traffic per terminal, with sporadic transaction-oriented messaging bursts.

However, it will be understood that the invention is not limited to this application. For example, the considered mobile terminated communication may take place to an MTC device from another MTC device. The invention may also apply to any mobile terminated communication to any type of destination device through any type of mobile communication network and from any type of source entity.

FIG. 2 shows an exemplary non-limiting MTC architecture in which the invention may take place according to a first embodiment.

In this example, a mobile terminated communication may take place from the MTC server 1 to the MTC device 2 through the EPS mobile communication network 10. It is assumed that the MTC device 2 is roaming in a visited network (VPLMN). Here, all the relevant EPS nodes are thus located in the VPLMN, except for the HSS/AAA node that resides in the Home network (HPLMN). So the mobile communication network 10 may be seen as the combination of HPLMN and VPLMN in the present example (or in other words, there are two mobile communication networks involved in this case). It should be noted however that the invention may take place alternatively in a single mobile communication network (e.g. a HPLMN without a VPLMN), for example if the MTC device 2 is not in a roaming situation.

Note also that the entities shown in FIG. 2 are the ones traditionally used in an LTE system. As will appear to one skilled in the art, other equipments may be used instead if the invention takes place in a non-LTE system. For example, any other type of subscriber server could be used in place of the HSS/AAA (e.g. HLR), any other type of mobile communication network node could be used in place of the MME (e.g. SGSN), any other gateway could be used in place of SGW/PGW (e.g. SGW only, PGW only, GGSN), etc.

As shown in FIG. 2, the MTC server 1 is located in a public IP address network 9. In this context, this means that the MTC server 1 is assigned a public IP address in a public IP address space.

As for the MTC device 2, it is assigned a static unique identifier, here after called "host name". For example, this "host name" may be a fully qualified domain name (FQDN) identifier specific to the MTC device 2. Advantageously, this "host name" is unique globally.

This "host name" is advantageously assigned in addition to and in relation with any EPS-level identity (such as IMSI or MSISDN or any other identity within the mobile communication network) of the MTC device 2. As a non-limiting example, assuming that the MTC device 2 has an International Mobile Subscriber Identity (IMSI) as the EPS-level identity, the "host name" may be defined as "mtc.IMSI.pub.3gppnetworks.org" or any other IMSI related static unique identifier.

The "host name" is used as the primary addressing identifier for mobile terminated communications.

Upon attachment to the mobile communication network, or within the framework of any other appropriate procedure, the MTC device 2 that relies on IP communications is assigned an IP address. The latter is a public IP address in the present embodiment, which is advantageously dynamically assigned. Alternatively, the MTC device 2 may be assigned a private IP address, as will be discussed in a second embodiment. In roaming scenarios the dynamic IP address may be assigned in the Visited PLMN.

The association between the "host name" and the dynamically assigned (public) IP address is stored in the authoritative Domain Name System (DNS) server 5 in the Home PLMN.

When the MTC device 2 is assigned a dynamic (public) IP address, the authoritative DNS server 5 is kept up-to-date using DNS Update mechanisms.

The entity performing DNS updates is preferably, but not necessarily, located in the Home PLMN in order to reduce the number of trusted interfaces to the DNS server 5.

With reference with FIG. 2, the HSS/AAA 3 is the entity that receives the IP address of the MTC device 2 and updates the DNS record containing the "host name" of the MTC device 2 in the authoritative DNS server 5 reachable via the public IP address network 9, with the MTC device 2 IP address.

The corresponding steps are detailed here after with reference to FIG. 3 (where the equipments shown are the ones of FIG. 2).

In step 11, the MTC device 2 performs an EPS Attach procedure. This attach procedure may be advantageously as described in 3GPP TS 23.401 V.8.7.0 (General Packet Radio Service (GPRS) enhancements for Evolved Universal Terrestrial Radio Access Network (E-UTRAN) access), the FIG. 5.3.2.1-1 of which is reproduced in FIG. 4. When comparing the equipments of FIGS. 2 and 3 and FIG. 4, the MTC device 2 would correspond to the UE, the eNB 8 would correspond to the eNodeB, the SGW/PGW 7 would correspond to the Serving GW and the PDN GW, and the HSS/AAA 3 would correspond to the HSS. Other mappings may be envisaged however.

As part of the EPS Attach procedure 11, the MTC device 2 is assigned an IP address, referred to here shortly as "D". In the present embodiment, this MTC device 2 IP address is considered to be a public IP address. Note that the MTC device 2 IP address could alternatively be obtained via any other procedure.

The S5/S8/S11 Create Session Response message or any other message may be used to convey the MTC device 2 IP address "D" from the SGW/PGW 7 to the MME 4.

As part of the previous step 11, or at the end of the EPS Attach procedure 11, the MME 4 notifies the HSS/AAA 3 with "D", e.g. by means of the Notify Request message followed by the Notify Response message (see the messages 12 in FIG. 3 and the last two messages in FIG. 4). Alternatively, this notification may be forwarded on a direct path between the SGW/PGW 7 and the HSS/AAA 3.

Note that the HSS/AAA 3 could alternatively receive the MTC device 2 IP address "D" from a node of the mobile communication network in any other possible way.

The HSS/AAA 3 then updates with the MTC device 2 IP address "D" the DNS record containing the "host name" of the MTC device 2 in the authoritative DNS server 5 reachable via the public IP address network 9. To do so, it can for example send a DNS Update message 13 to the authoritative DNS server 5 in order to associate "D" with said DNS record for the MTC device 2 (the latter being referenced via its unique "host name"). This requires a new type of DNS record.

At some point 14 in time, the MTC server 1 may wish to initiate a Mobile terminated (MT) communication to the MTC device 2 through the mobile communication network 10.

Accordingly, the MTC server 1 may send a DNS query 15 that eventually reaches the authoritative DNS server 5 (possibly via another DNS server or a chain of other DNS servers). This DNS query 15 includes the "host name" i.e. the static unique identifier of the MTC device 2.

The DNS response 16 of the authoritative DNS server received by the MTC server 1 includes the MTC device 2 IP address "D".

Then the MTC server 1 can send at least one IP packet intended to the MTC device 2, by using its address "D" as a destination IP address (see reference 17).

On reception of the IP packet(s), the SGW/PGW 7 or any other suitable mobile communication network node can deliver it to the MTC device 2 via an EPS bearer (see reference 18).

So in the embodiment described above, the problem that may occur with dynamically assigned public IP addresses was circumvented by assigning to the destination device a static unique identifier in the form of "host name" such as a user specific FQDN. When a new public IP address is assigned to the destination device, the subscriber server owning the corresponding user's subscription updates the address-to-FQDN association in the authoritative DNS server.

This approach however is not sufficient for private IP addresses. This is because a destination device private IP address obtained via DNS resolution would then be a non-routable IP address.

A second embodiment of the present invention thus extends the above mentioned first embodiment for the case where the destination device is assigned a private IP address within a private IP address network.

This situation is illustrated in FIG. 5, where the corresponding elements are designated with the same reference numbers as in FIG. 2.

FIG. 5 shows a private IP network 19 in which the MTC device 2 may be assigned a private IP address (for example a private IPv4 address due to the limitation of the public IPv4 address space). It also shows a tunneling border device, called NATTT device 21. The latter is located on the border of the private IP address network 19 and terminates a tunnel 20, e.g. a UDP tunnel, for IP packets sent from the MTC server 1 to the MTC device 2. The MTC device 2 private IP address is reachable through this NATTT device 21.

The notion of tunneling border device was developed in an article called "NAT Traversal through Tunneling (NATTT)", available at the following address: www.cs.arizona.edu/.about.bzhang/nat/nattt.htm.

FIG. 6 shows an example of steps that may be carried out to allow mobile terminated communication according to the second embodiment.

The steps of FIG. 6 are similar to the ones already described with reference to FIG. 3. However, the following additional features can be observed.

Also as part of the procedure EPS attach procedure 22 (or any other appropriate procedure), the SGW/PGW 7 returns, in addition to "D", the public IP address of the NATTT device 21, referred to here shortly as "N", through which the private address "D" is reachable. If there are several NATTT devices on the border of the private IP network, the SGW/PGW 7 may select any that provides access to the private address "D".

The S5/S8/S11 Create Session Response message may be used to convey both "D" and "N" from the SGW/PGW 7 to the MME 4.

The notification request (+response) 23, compared to the notification 12, includes the address "N" in addition to "D".

Note that the HSS/AAA 3 may receive the NATTT device 21 public IP address "N" in a different way, for example from a different node of the mobile communication network and/or in a notification message different from the one including the MTC device 2 IP address "D".

The HSS/AAA 3 updates the DNS record for the MTC device 2 (referenced via its unique "host name") in the authoritative DNS server 5, not only with "D" but also with "N". The two updates may be simultaneous, for example by means of a single DNS update message 13 as shown in FIG. 3, or at different points in time, for example by means of two separate DNS update messages. As a result of the updates, the two addresses "D" and "N" are associated with the DNS record for the MTC device 2 containing its static unique identifier or "host name".

When a mobile terminated communication to the MTC device 2 is to be initiated through the mobile communication network by the MTC server 1 (step 25), the DNS query 26, which is sent by the MTC server 1 and includes the MTC device 2 "host name", eventually reaches the authoritative DNS server 5.

The DNC response 27 includes both the MTC device 2 private IP address "D" and the NATTT device 21 public IP address "N".

The MTC server 1 advantageously performs encapsulation of the IP packet(s) it wishes to send to the MTC device 2 and sends the encapsulated IP packet(s) to the NATTT device 21.

The encapsulation may be UDP encapsulation (which caters with NAT traversal of any nested NAT devices on the path) or any other encapsulation such as IP-in-IP encapsulation.

As shown in FIG. 7, the encapsulation may be such that the destination IP address 34 in the outer IP header is set to "N" and the destination IP address 32 in the inner IP header is set to "D".

In case of UDP encapsulation, the UDP port in the UDP encapsulation header 35 may be set to a predetermined well-known value, as described in the above-mentioned article "NAT Traversal through Tunneling (NATTT)". Note that any other indication for the tunneling border NATTT device 21 to decapsulate and forward the IP packet(s) received from the MTC server 1 could be used in addition to or in replacement of said UDP port.

Also as shown in FIG. 7, the source IP address in both the inner and outer IP headers (31 and 33) may be set to the public IP address of the MTC server 1 (referenced @1 in FIG. 7).

On reception, the NATTT device 21 identifies the received packet as a NAT tunnelled packet, for example because it arrives on the well-known UDP port. It strips off the outer IP header and forwards the inner IP packet to the mobile communication network (see step 29).

The inner IP packet reaches the SGW/PGW 7 (or any other appropriate node of the mobile communication network) hosting the MTC device 2 private IP address "D". The SGW/PGW 7 then delivers the packet to the destination MTC device 2 via an appropriate EPS bearer (see step 30).

Other variants can be envisaged within the framework of the present invention as claimed in the appended set of claims, as will appear to one skilled in the art.

The invention claimed is:

1. A method for processing information associated with IP addresses in a mobile communication system, the method comprising:

receiving, by a domain name system (DNS) entity, information on a private IP address of a machine type communication (MTC) device located in a private IP network and a public IP address of a network address translation (NAT) entity from a home Subscriber server (HSS), the private IP address being assigned when the MTC device performs an Evolved Packet System (EPS) attach procedure;

associating, by the DNS entity, the private IP address and the public IP address with a host name which is a fully qualified domain name (FQDN) of the MTC device;

receiving, by the DNS entity, a query message including the host name from an MTC server that attempts to send a mobile terminated message to the MTC device and is located in a public IP network; and in response to the query message, transmitting, by the DNS entity, a query response message including the private IP address and the public IP address to the MTC server to enable the MTC server to deliver an encapsulated packet, which includes an outer header being set based on the public IP address and an inner header being set based on the private IP address, to the NAT entity.

2. The method of claim 1, wherein the encapsulated packet is delivered to the MTC device after the public IP address is stripped off by the NAT entity.

3. The method of claim 1, wherein the encapsulated packet is delivered to the NAT entity by using the public IP address.

4. The method of claim 1, wherein the encapsulated packet is delivered to the MTC device entity by using the private IP address.

5. The method of claim 1, wherein the NAT entity is located between the public IP network and the private IP network.

6. A domain name system (DNS) entity for processing information associated with IP addresses in a mobile communication system, comprising:
   an interface unit configured to communicate with a corresponding entity; and
   a processor coupled to the interface unit and configured to:
      receive information on a private IP address of a machine type communication (MTC) device located in a private IP network and a public IP address of a network address translation (NAT) entity from a home Subscriber server (HSS), the private IP address being assigned when the MTC device performs an Evolved Packet System (EPS) attach procedure;
      associate the private IP address and the public IP address with a host name which is a fully qualified domain name (FQDN) of the MTC device;
      receive a query message including the host name from an MTC server that attempts to send a mobile terminated message to the MTC device and is located in a public IP network; and
      in response to the query message, transmit a query response message including the private IP address and the public IP address to the MTC server to enable the MTC server to deliver an encapsulated packet, which includes an outer header being set based on the public IP address and an inner header being set based on the private IP address, to the NAT entity.

7. The DNS entity of claim 6, wherein the encapsulated packet is delivered to the MTC device after the public IP address is stripped off by the NAT entity.

8. The DNS entity of claim 6, wherein the encapsulated packet is delivered to the NAT entity by using the public IP address.

9. The DNS entity of claim 6, wherein the encapsulated packet is delivered to the MTC device entity by using the private IP address.

10. The method of claim 1, wherein:
   the mobile network system includes a home Public Land Mobile Network (PLMN) and a visitor PLMN;
   the MTC device roams in the visitor PLMN; and
   the private IP address is assigned by a Packet data network Gateway (PGW) located in the visitor PLMN.

11. The method of claim 10, wherein the HSS is located in the home PLMN.

12. The method of claim 11, wherein the MTC server is located in the home PLMN.

13. The DNS entity of claim 6, wherein:
   the mobile network system includes a home Public Land Mobile Network (PLMN) and a visitor PLMN;
   the MTC device roams in the visitor PLMN; and
   the private IP address is assigned by a Packet data network Gateway (PGW) located in the visitor PLMN.

14. The DNS entity of claim 13, wherein the HSS is located in the home PLMN.

15. The DNS entity of claim 14, wherein the MTC server is located in the home PLMN.

16. The DNS entity of claim 6, wherein the NAT entity is located between the public IP network and the private IP network.

* * * * *